(12) United States Patent
Tomizawa et al.

(10) Patent No.: US 12,183,877 B2
(45) Date of Patent: Dec. 31, 2024

(54) ALL SOLID BATTERY

(71) Applicant: TAIYO YUDEN CO., LTD., Tokyo (JP)

(72) Inventors: Sachie Tomizawa, Tokyo (JP); Daigo Ito, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 184 days.

(21) Appl. No.: 17/321,084

(22) Filed: May 14, 2021

(65) Prior Publication Data

US 2021/0408582 A1 Dec. 30, 2021

(30) Foreign Application Priority Data

Jun. 29, 2020 (JP) ................ 2020-111725

(51) Int. Cl.
*H01M 10/0562* (2010.01)
(52) U.S. Cl.
CPC .............. *H01M 10/0562* (2013.01)
(58) Field of Classification Search
CPC ............ H01M 10/0585; H01M 10/0562
See application file for complete search history.

(56) References Cited

U.S. PATENT DOCUMENTS

| | | | |
|---|---|---|---|
| 2012/0276439 A1 | 11/2012 | Fujita et al. | 429/149 |
| 2013/0017435 A1 | 1/2013 | Sato et al. | 429/158 |
| 2015/0099158 A1 | 4/2015 | Iwase | H01M 2/1686 |
| 2018/0198170 A1 | 7/2018 | Fujita et al. | H01M 10/0585 |
| 2020/0067133 A1 | 2/2020 | Sato et al. | H01M 10/0562 |
| 2021/0384549 A1* | 12/2021 | Yano | H01M 10/0562 |
| 2022/0115663 A1* | 4/2022 | Tanaka | H01M 4/62 |

FOREIGN PATENT DOCUMENTS

| | | | | |
|---|---|---|---|---|
| JP | 2011-129474 A | 6/2011 | | |
| JP | 2011-216235 A | 10/2011 | | |
| JP | 2016-207540 A | 12/2016 | | |
| WO | WO 2017/065035 A1 | 4/2017 | | |
| WO | WO-2020111166 A1 * | 6/2020 | | H01M 10/0525 |
| WO | WO-2020184652 A1 * | 9/2020 | | H01M 10/0562 |

OTHER PUBLICATIONS

Office Action issued on Jan. 22, 2024 in a counterpart Chinese Patent Application No. 202110711929.5.

* cited by examiner

*Primary Examiner* — Sadie White
*Assistant Examiner* — Kayla Elaine Clary
(74) *Attorney, Agent, or Firm* — Stein IP, LLC

(57) ABSTRACT

An all solid battery includes a multilayer chip in which plurality of internal electrodes are alternately exposed to two side faces. A thickness SE of a solid electrolyte layer is 1 μm or more and 50 μm or less in an intersection portion in which two internal electrodes next to each other connected to different external electrodes overlap with each other. Thicknesses EL1 and EL2 of the two internal electrodes are 1 μm or more and 200 μm or less. In one of two non-intersection portions, a length EM from one of the pair of external electrodes contacting the one of the two non-intersection portions to an internal electrode spaced from the one of the pair of external electrodes in a distance direction is 50 μm or more and 800 μm or less. EM/(SE+EL1/4+EL2/4) is 20 or less.

8 Claims, 7 Drawing Sheets

ALL SOLID BATTERY

CROSS-REFERENCE TO RELATED APPLICATION

This application is based upon and claims the benefit of priority of the prior Japanese Patent Application No. 2020-111725, filed on Jun. 29, 2020, the entire contents of which are incorporated herein by reference.

FIELD

A certain aspect of the present invention relates to an all solid battery.

BACKGROUND

Recently, secondary batteries are being used in various fields. Secondary batteries having electrolytic liquid has a problem such as liquid leakage. And so, all solid batteries that have a solid electrolyte layer and are formed by only solid elements are being developed (for example, see Japanese Patent Application Publication No. 2011-216235 and Japanese Patent Application Publication No. 2011-129474).

SUMMARY OF THE INVENTION

According to an aspect of the present invention, there is provided an all solid battery including: a multilayer chip in which each of a plurality of solid electrolyte layers including a solid electrolyte and each of a plurality of internal electrodes including an electrode active material are alternately stacked, the multilayer chip having a rectangular parallelepiped shape, the plurality of internal electrodes being alternately exposed to two side faces other than two end faces in a stacking direction of the multilayer chip; and a pair of external electrodes, each of which contacts each of the two side faces, wherein a thickness SE of the solid electrolyte layer is 1 μm or more and 50 μm or less in an overlap portion in which two internal electrodes next to each other connected to different external electrodes overlap with each other in a planar view of the two internal electrodes, wherein thicknesses EL1 and EL2 of the two internal electrodes are 1 μm or more and 200 μm or less, wherein, in one of two non-overlap portions in which the two internal electrodes do not overlap with each other, a length EM from one of the pair of external electrodes contacting the one of the two non-overlap portions to an internal electrode spaced from the one of the pair of external electrodes in a distance direction is 50 μm or more and 800 μm or less, and wherein EM/(SE+EL1/4+EL2/4) is 20 or less.

According to another aspect of the present invention, there is provided an all solid battery including: a multilayer chip in which each of a plurality of solid electrolyte layers including a solid electrolyte and each of a plurality of internal electrodes including an electrode active material are alternately stacked, the multilayer chip having a rectangular parallelepiped shape, the plurality of internal electrodes being alternately exposed to two side faces other than two end faces in a stacking direction of the multilayer chip; and a pair of external electrodes, each of which contacts each of the two side faces, wherein the plurality of internal electrodes have a structure in which an electric collector layer of which a main component is a conductive material is sandwiched by two internal electrode layers, wherein a thickness SE of the solid electrolyte layer is 1 μm or more and 50 μm or less in an overlap portion in which two internal electrodes next to each other connected to different external electrodes overlap with each other in a planar view of the two internal electrodes, wherein when a total thickness of two internal electrode layers of one of the two internal electrodes is EL1 and a total thickness of two internal electrode layers of the other of the two internal electrodes is EL2, the thickness EL1 and the thickness EL2 are 1 μm or more and 200 μm or less, wherein, in one of two non-overlap portions in which the two internal electrodes do not overlap with each other, a length EM from one of the pair of external electrodes contacting the one of the two non-overlap portions to an internal electrode spaced from the one of the pair of external electrodes in a distance direction is 50 μm or more and 800 μm or less, and wherein EM/(SE+EL1/4+EL2/4) is 20 or less.

DETAILED DESCRIPTION

In an all solid battery, expansion and contraction of electrode active materials caused by charge and discharge cause degradation of long-term cycle stability. In particular, in a sintered type of an oxide-based all solid battery, when the number of contact points between internal electrodes and solid electrolyte layers is reduced because of the expansion and contraction, normal battery operation cannot be performed. When thicknesses of electrode layers and solid electrolyte layers are within an adequate range, the normal battery operation cannot be performed because of occurrence of shorts and degradation of responsiveness.

A description will be given of an embodiment with reference to the accompanying drawings.

First Embodiment

Figure 1:
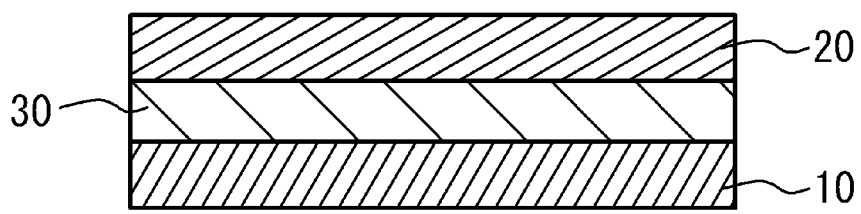
FIG. 1 illustrates a schematic cross section of a basic structure of an all solid battery.

FIG. 1 illustrates a schematic cross section of a basic structure of an all solid battery 100 in accordance with an embodiment. As illustrated in FIG. 1, the all solid battery 100 has a structure in which a first internal electrode 10 and a second internal electrode 20 sandwich a solid electrolyte layer 30. The first internal electrode 10 is provided on a first main face of the solid electrolyte layer 30. The second internal electrode 20 is provided on a second main face of the solid electrolyte layer 30.

When the all solid battery 100 is used as a secondary battery, one of the first internal electrode 10 and the second internal electrode 20 is used as a positive electrode and the other is used as a negative electrode. In the embodiment, as an example, the first internal electrode 10 is used as a positive electrode, and the second internal electrode 20 is used as a negative electrode.

A main component of the solid electrolyte layer 30 is solid electrolyte having ionic conductivity. The solid electrolyte of the solid electrolyte layer 30 is an oxide-based solid electrolyte having lithium ion conductivity. The solid electrolyte is a phosphoric acid salt-based electrolyte having a NASICON structure. The phosphoric acid salt-based solid electrolyte having the NASICON structure has a high conductivity and is stable in normal atmosphere. The phosphoric acid salt-based solid electrolyte is, for example, a salt of phosphoric acid including lithium. The phosphoric acid salt is not limited. For example, the phosphoric acid salt may be composite salt of phosphoric acid with Ti (for example $LiTi_2(PO_4)_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. To be concrete, the phosphoric acid salt including lithium and having the NASICON structure is $Li_{1+x}Al_xGe_{2-x}(PO_4)_3$, $Li_{1+x}Al_xZr_{2-x}(PO_4)_3$, $Li_{1+x}Al_xT_{2-x}(PO_4)_3$ or the like. For example, it is preferable that an Li—Al—Ge—$PO_4$-based material, to which a transition metal included in the phosphoric acid salt having the olivine type crystal structure included in the first internal electrode 10 and the second internal electrode 20 is added in advance, is used. For example, when the first internal electrode 10 and the second internal electrode 20 include phosphoric acid salt including Co and Li, it is preferable that the solid electrolyte layer 30 includes an Li—Al—Ge—$PO_4$-based material to which Co is added in advance. In this case, it is possible to suppress dissolving of the transition metal included in the electrode active material into the electrolyte. When the first internal electrode 10 and the second internal electrode 20 include phosphoric acid salt including Li and a transition metal other than Co, it is preferable that the solid electrolyte layer 30 includes Li—Al—Ge—$PO_4$-based material in which the transition metal is added in advance.

At least, the first internal electrode 10 used as a positive electrode includes a material having an olivine type crystal structure, as an electrode active material. It is preferable that the second internal electrode 20 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, $LiCoPO_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or $PO_4$ may fluctuate in accordance with a valence. It is preferable that Co, Mn, Fe, Ni or the like is used as the transition metal.

The electrode active material having the olivine type crystal structure acts as a positive electrode active material in the first internal electrode 10 acting as a positive electrode. For example, when only the first internal electrode 10 includes the electrode active material having the olivine type crystal structure, the electrode active material acts as the positive electrode active material. When the second internal electrode 20 also includes an electrode active material having the olivine type crystal structure, discharge capacity may increase and an operation voltage may increase because of electric discharge, in the second internal electrode 20 acting as a negative electrode. The function mechanism is not completely clear. However, the mechanism may be caused by partial solid-phase formation together with the negative electrode active material.

When both the first internal electrode 10 and the second internal electrode 20 include an electrode active material having the olivine type crystal structure, the electrode active material of each of the first internal electrode 10 and the second internal electrode 20 may have a common transition metal. Alternatively, the transition metal of the electrode active material of the first internal electrode 10 may be different from that of the second internal electrode 20. The first internal electrode 10 and the second internal electrode 20 may have only a single type of transition metal. The first internal electrode 10 and the second internal electrode 20 may have two or more types of transition metal. It is preferable that the first internal electrode 10 and the second internal electrode 20 have a common transition metal. It is more preferable that the electrode active materials of both of the internal electrodes 10, 20 have the same chemical composition. When the first internal electrode 10 and the second internal electrode 20 have a common transition metal or a common electrode active material of the same composition, similarity between the compositions of both of the internal electrodes 10, 20 increases. Therefore, even if terminals of the all solid battery 100 are connected in a positive/negative reversed state, the all solid battery 100 can actually be used without malfunction, in accordance with the usage purpose.

The second internal electrode 20 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second internal electrode 20. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid salt, a carbon, a vanadium lithium phosphate.

In the forming process of the first internal electrode 10 and the second internal electrode 20, moreover, oxide-based solid electrolyte material or a conductive material (conductive auxiliary agent) such as a carbon material or a metal material may be added. When the material is evenly dispersed into water or organic solution together with binder or plasticizer, paste for the electrode layer is obtained. In the embodiment, a carbon material is used as the conductive auxiliary agent. A metal material may be used as the auxiliary agent, in addition to the carbon material. Pd, Ni, Cu, or Fe, or an alloy thereof may be used as the metal material of the conductive auxiliary agent. For example, the electrolyte of the first internal electrode 10 and the second internal electrode 20 may be the same as the main component solid electrolyte of the solid electrolyte layer 30.

Figure 2A:
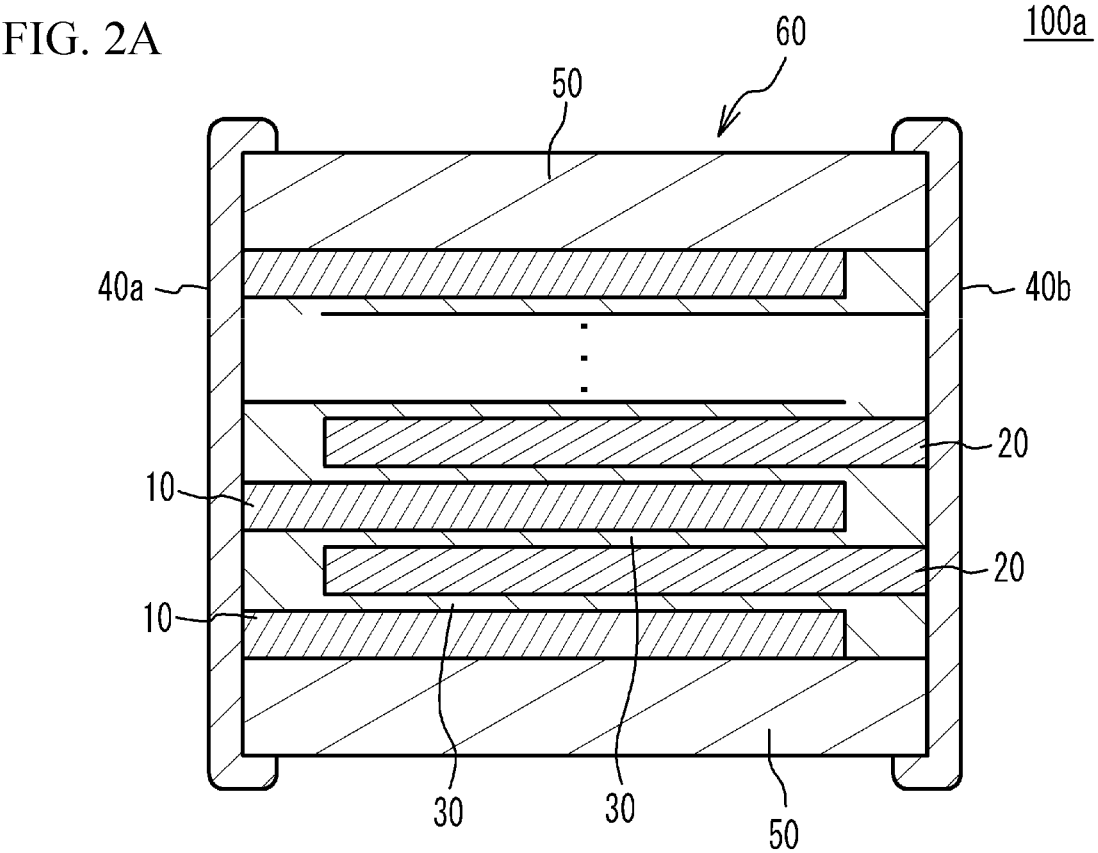
FIG. 2A and FIG. 2B illustrate a schematic cross section of an solid battery.

FIG. 2A illustrates a schematic cross section of an all solid battery 100a in which a plurality of cell units are stacked. The all solid battery 100a has a multilayer chip 60 having a rectangular parallelepiped shape. Each of a first external electrode 40a and a second external electrode 40b is provided directly on each of two side faces among four side faces which are other than an upper face and a lower face of the multilayer chip 60 in the stacking direction. The two side faces may be adjacent to each other. Alternatively, the two side faces may be face with each other. In the embodiment, the first external electrode 40a is provided on one of the two facing side faces (end faces), and the second external electrode 40b is provided on the other of the two facing side faces.

In the following description, the same numeral is added to each member that has the same composition range, the same thickness range and the same particle distribution range as that of the all solid battery 100. And, a detail explanation of the same member is omitted.

In the all solid battery 100a, each of the first internal electrodes 10 and each of the second internal electrodes 20 are alternately stacked through each of the solid electrolyte layers 30. Edges of the first internal electrodes 10 are exposed to the first edge face of the multilayer chip 60 but are not exposed to the second edge face of the multilayer chip 60. Edges of the second internal electrodes 20 are exposed to the second edge face of the multilayer chip 60 but are not exposed to the first edge face. Thus, each of the first internal electrodes 10 and each of the second internal electrodes 20 are alternately conducted to the first external electrode 40a and the second external electrode 40b. The solid electrolyte layer 30 extends from the first external electrode 40a to the second external electrode 40b. In the all solid battery 100a, the all solid battery 100a has a structure in which a plurality of cell units are stacked.

A cover layer 50 is formed on an upper face of the multilayer structure of the first internal electrodes 10, the solid electrolyte layers 30 and the second internal electrodes 20 (in FIG. 2A, an upper face of an uppermost first internal electrode 10). Another cover layer 50 is formed on a lower face of the multilayer structure (in FIG. 2, a lower face of an lowermost first internal electrode 10). A main component of the cover layers 50 is an inorganic material including Al, Zr, Ti or the like (for example, $Al_2O_3$, $ZrO_2$, $TiO_2$ or the like). The main component of the cover layers 50 may be the main component of the solid electrolyte layer 30.

Figure 2B:
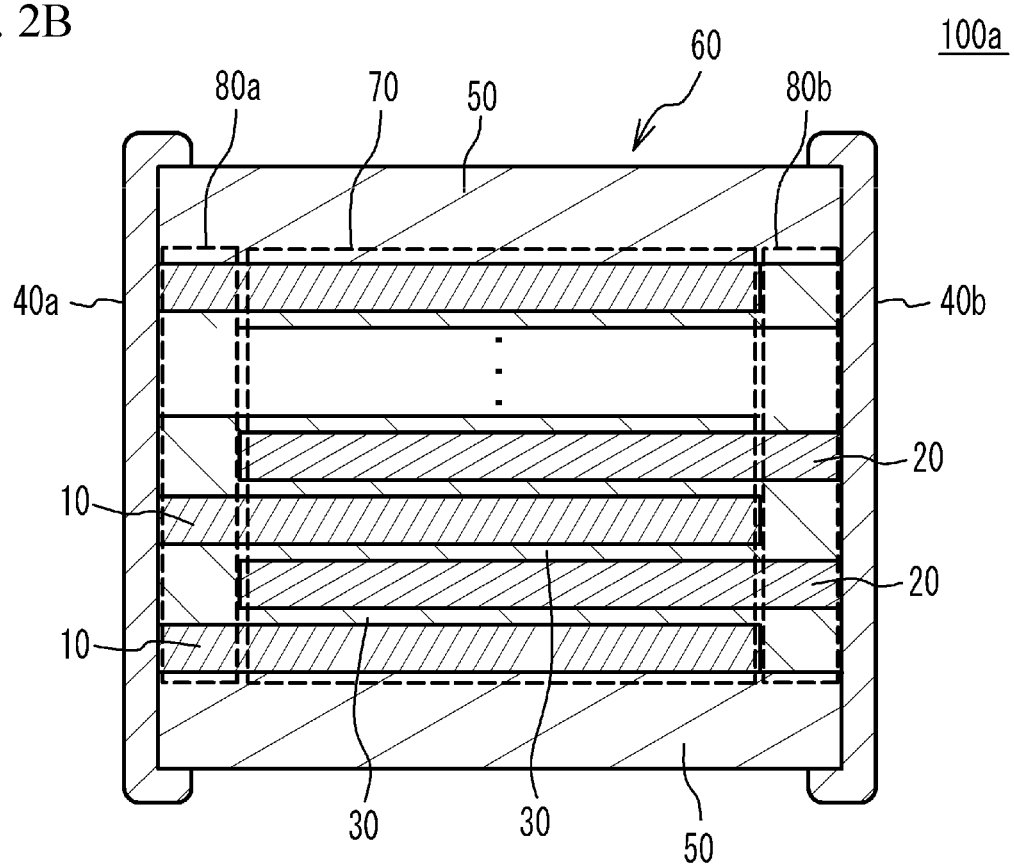

As illustrated in FIG. 2B, a section in which the first internal electrodes 10 connected to the first external electrode 40a and the second internal electrodes 20 connected to the second external electrode 40b face each other is a section acting as a battery in the all solid battery 100a. In the section, the first internal electrodes 10 overlap with the second internal electrodes 20 in a planar view of the first internal electrodes 10 and the second internal electrodes 20. Therefore, the section is referred to as an overlap portion 70. That is, the overlap portion 70 is a section in which internal electrodes connected to different external electrodes face each other.

A section where the first internal electrodes 10 connected to the first external electrode 40a face each other with no second internal electrode 20 connected to the second external electrode 40b interposed therebetween is referred to as a non-overlap portion 80a. A section where the second internal electrodes 20 connected to the second external electrode 40b face each other with no first internal electrode 10 connected to the first external electrode 40a interposed therebetween is referred to as a non-overlap portion 80b. The non-overlap portions 80a and 80b are sections in which the first internal electrodes 10 do not overlap with the second internal electrodes 20 in a planar view of the first internal electrodes 10 and the second internal electrodes 20. That is, the non-overlap portions 80a and 80b are sections where the internal electrodes connected to one of the external electrodes face each other with no internal electrode connected to the other of the external electrodes interposed therebetween. In the non-overlap portions 80a and 80b, the battery operation is hardly performed.

In the all solid battery 100a, expansion and contraction of electrode active materials caused by charge and discharge cause cracks. A crack causes degradation of long-term cycle stability. In particular, in the sintered type of the oxide-based all solid battery, when the number of contact points between the first internal electrodes 10 and the solid electrolyte layers 30 and the number of contact points between the second internal electrodes 20 and the solid electrolyte layers 30 are reduced because of the expansion and contraction, normal battery operation cannot be performed. Therefore, suppression of the reduction of the contact points is needed for the long-term reliability and the performance reliability of the all solid battery 100a.

When the non-overlap portions 80a and 80b hardly act as a battery, a volume gap occurs between the overlap portion 70 and the non-overlap portions 80a and 80b in the same electrode because of expansion and contraction of the electrode active material during charging. In this case, the number of contact points between members at an interface is reduced. And, normal battery operation may not be necessarily achieved. And so, the all solid battery 100a of the embodiment has a structure in which the non-overlap portions 80a and 80b easily act as a battery. That is, the all solid battery 100a has a structure in which a ratio of the battery operation of the non-overlap portions 80a and 80b in the battery operation of the whole of the all solid battery 100a is high. Thereby, the reduction of the contact points between the first internal electrode 10 and the solid electrolyte layer 30 is suppressed. And the reduction of the contact points between the second internal electrode 20 and the solid electrolyte layer 30 is suppressed.

When the first internal electrode 10 and the second internal electrode 20 are thin, the capacity density of whole of the all solid battery 100a may be small. On the other hand, when the first internal electrode 10 and the second internal electrode 20 are thick, the responsiveness of whole of the all solid battery 100a may be degraded. Next, when the solid electrolyte layer 30 is thin, shorts may occur and the reliability of the whole of the all solid battery 100a may be degraded. On the other hand, when the solid electrolyte layer 30 is thick, the responsiveness of whole of the all solid battery 100a may be degraded. It is therefore preferable that the thickness of the first internal electrode 10 has an upper limit and a lower limit. It is preferable that the thickness of the second internal electrode 20 has an upper limit and a lower limit. It is preferable that the thickness of solid electrolyte layer 30 has an upper limit and a lower limit.

Figure 3A:
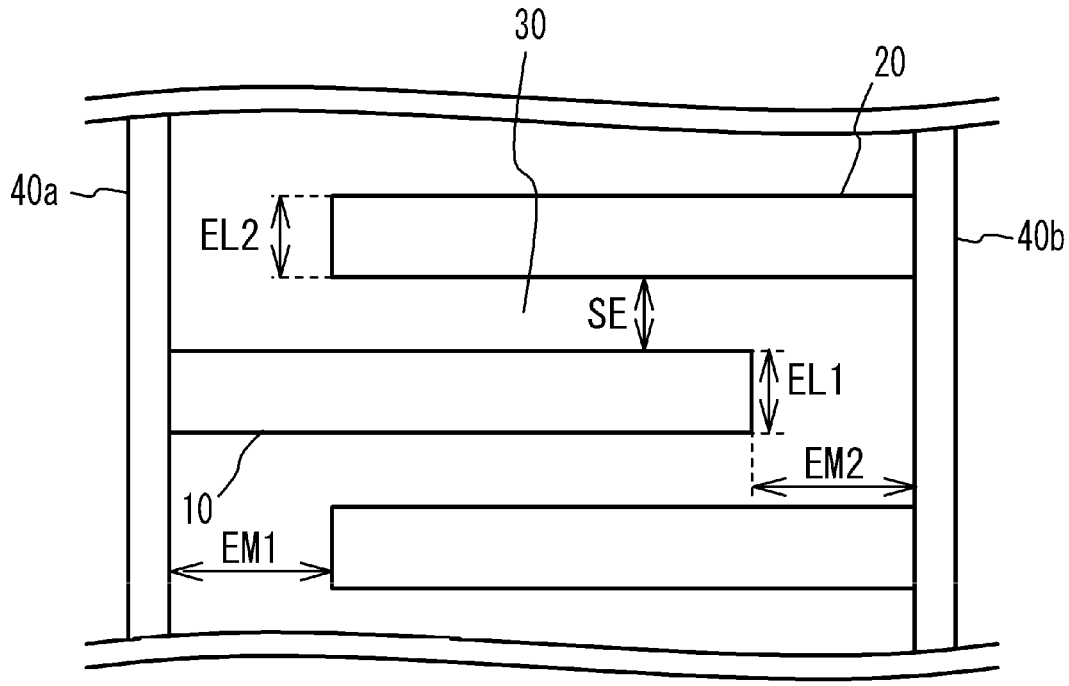
FIG. 3A and FIG. 3B illustrate each size.

As illustrated in FIG. 3A, an average thickness of each of the solid electrolyte layers 30 in the overlap portion 70 illustrated in FIG. 2B is a thickness SE. An average thickness of each of the first internal electrodes 10 is a thickness EL1. An average thickness of each of the second internal electrodes 20 is a thickness EL2. A length of the non-overlap portion 80a illustrated in FIG. 2B is a length EM1 in a distance direction between the first external electrode 40a and edges of the second internal electrodes 20. A length of the non-overlap portion 80b illustrated in FIG. 2B is a length EM2 in a distance direction between the second external electrode 40b and edges of the first internal electrodes 10.

In the embodiment, the thickness SE is 1 μm or more. It is preferable that the thickness SE is 2 μm or more. It is more preferable that the thickness SE is 5 μm or more. The thickness SE is 50 μm or less. It is preferable that the thickness SE is 30 μm or less. It is more preferable that the thickness SE is 20 μm or less.

The thickness EL1 is 200 μm or less. It is preferable that the thickness EL1 is 100 μm or less. It is more preferable that the thickness EL1 is 50 μm or less. The thickness EL2 is 200 μm or less. It is preferable that the thickness EL2 is 100 μm or less. It is more preferable that the thickness EL2 is 50 μm or less. The thickness EL1 is 1 μm or more. It is preferable that the thickness EL1 is 5 μm or more. It is more preferable that the thickness EL1 is 10 μm or more. The thickness EL2 is 1 μm or more. It is preferable that the thickness EL2 is 5 μm or more. It is more preferable that the thickness EL2 is 10 μm or more.

When the non-overlap portions 80a and 80 are short, a ratio of the battery operation of the non-overlap portions 80a and 80b is large. This is because an average distance between an arbitrary position of electrodes in the non-overlap portions 80a and 80b and an edge of an opposite electrode is small. On the other hand, when the non-overlap portions 80a and 80b is excessively short, a distance between the internal electrode and the external electrode of which a polarity is opposite to the internal electrode is short. Therefore, a short occurrence rate may be large. It is therefore preferable that the length EM1 and the length EM2 have an upper limit and a lower limit. In the embodiment, the length EM1 is 50 μm or more. It is preferable that the length EM1 is 100 μm or more. It is more preferable that the length EM1 is 150 μm or more. The length EM1 is 800 μm or less. It is preferable that the length EM1 is 600 μm or less. It is more preferable that the length EM1 is 400 μm or less.

Figure 3B:
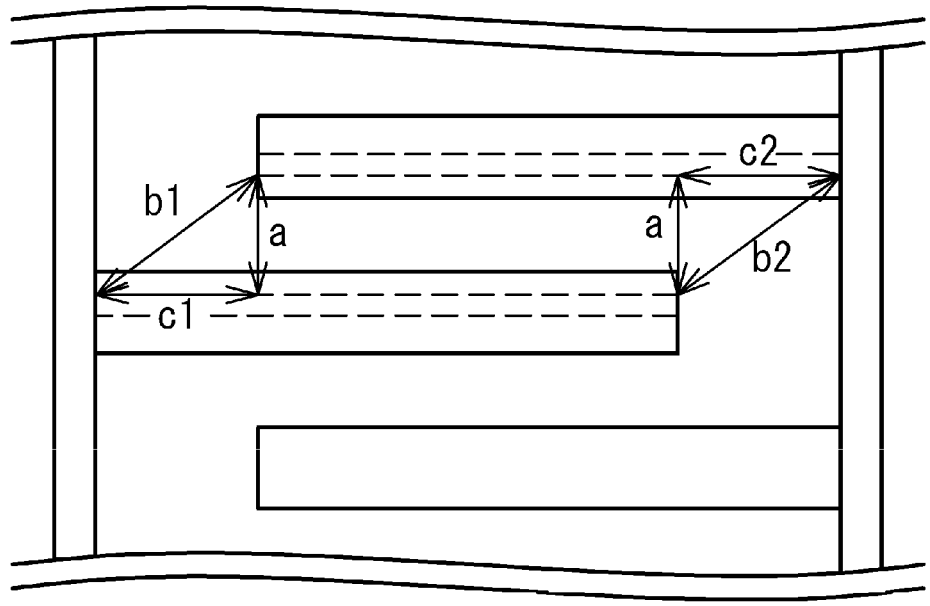

Next, as illustrated in FIG. 3B, "a" is SE+EL1/4+EL2/4. "c1" is EM1. "c2" is EM2. A length of hypotenuse is "b1" when the length "a" and the length "c1" are two sides crossing at right angles. A length of hypotenuse is "b2" when the length "a" and the length "c2" are two sides crossing at right angles.

When the ratio b1/a is small, a distance from the second internal electrode 20 to the vicinity of the first external electrode 40a which is the farthest in the first internal electrode 10 from the second internal electrode 20 is smaller than the distance between the first internal electrode 10 and the second internal electrode 20. In this case, the ratio of the battery operation of the non-overlap portion 80a is large. And so, it is preferable that the ratio b1/a is small. The ratio b1/a is approximately proportional to the ratio c1/a. In the embodiment, the ratio c1/a is a small value. In the embodiment, the ratio c1/a is 20 or less. It is preferable that the ratio c1/a is 15 or less. It is more preferable that the ratio c1/a is 10 or less.

On the other hand, when the ratio c1/a is excessively small, the risk of a short may get higher. And so, it is preferable that the ratio c1/a has a lower limit. For example, the ratio c1/a is 0.2 or more. It is more preferable that the ratio c1/a is 0.77 or more. It is still more preferable that the ratio b1/a is 2.14 or more.

When the ratio b2/a is small, a distance from the first internal electrode 10 to the vicinity of the second external electrode 40b which is the farthest in the second internal electrode 20 from the first internal electrode 10 is smaller than the distance between the first internal electrode 10 and the second internal electrode 20. In this case, the ratio of the battery operation of the non-overlap portion 80b is large. And so, it is preferable that the ratio b2/a is small. The ration b2/a is approximately proportional to the ratio c2/a. In the embodiment, the ratio c2/a is a small value. In the embodiment, the ratio c2/a is 20 or less. It is preferable that the ratio c2/a is 15 or less. It is more preferable that the ratio c2/a is 10 or less.

On the other hand, when the ratio c2/a is excessively small, the risk of a short may get higher. And so, it is preferable that the ratio c2/a has a lower limit. For example the ratio c2/a is 0.2 or more. It is more preferable that the ratio c2/a is 0.77 or more. It is still more preferable that the ratio b2/a is 2.14 or more.

Figure 4:
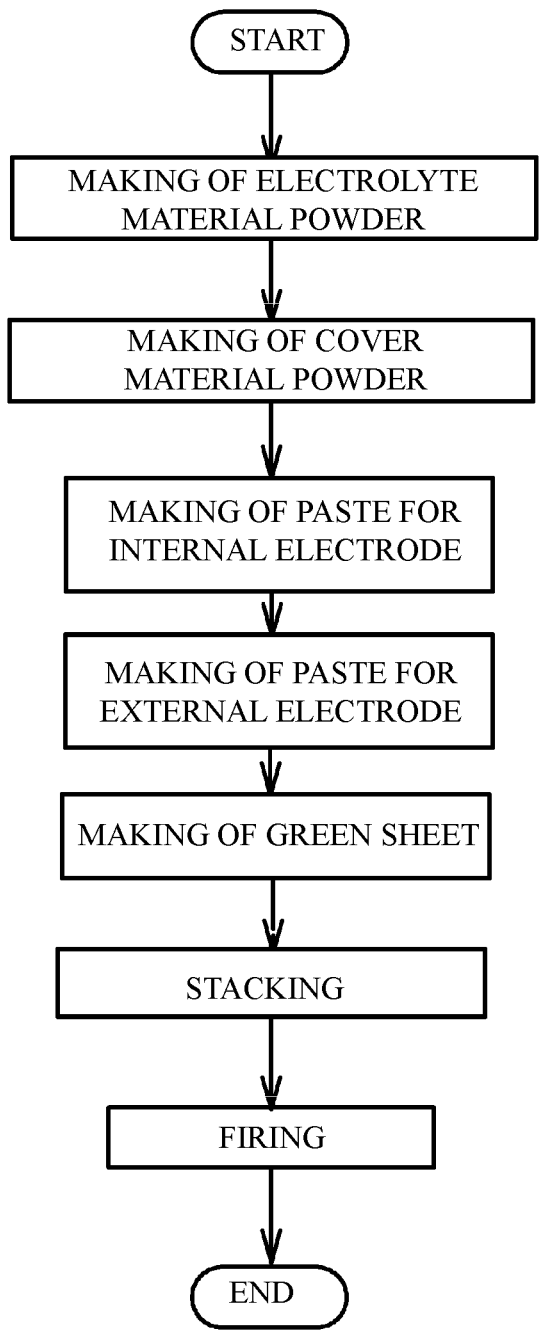
FIG. 4 illustrates a flowchart of a manufacturing method of an all solid battery.

A description will be given of a manufacturing method of the all solid battery 100a described in FIG. 2A. FIG. 4 illustrates a flowchart of the manufacturing method of the all solid battery 100a.

(Making process of material powder for solid electrolyte layer) Material powder of solid electrolyte for the solid electrolyte layer 30 is made. For example, it is possible to make the material powder for the solid electrolyte layer 30, by mixing raw material and additives and using solid phase synthesis method or the like. The resulting powder is subjected to dry grinding. Thus, an average particle diameter of the resulting powder is adjusted to a desired one. For example, it is possible to adjust the average particle diameter to the desired diameter with use of planetary ball mill using $ZrO_2$ ball of 5 mm $\phi$.

(Making process of material powder for cover layer) Ceramic material powder of for the cover layer 50 is made. For example, it is possible to make the material powder for the cover layer 50, by mixing raw material and additives and using solid phase synthesis method or the like. The resulting powder is subjected to dry grinding. Thus, an average particle diameter of the resulting powder is adjusted to a desired one. For example, it is possible to adjust the average particle diameter to the desired diameter with use of a planetary ball mill using a $ZrO_2$ ball of 5 mm $\phi$.

(Making process of paste for internal electrode) Next, paste for internal electrodes is made in order to make the first internal electrode 10 and the second internal electrode 20. For example, a conductive auxiliary agent, an electrode active material, a solid electrolyte material, a sintering assistant, a binder, a plasticizer and so on are evenly dispersed into water or organic solvent. Thus, paste for internal electrode layer is obtained. The above-mentioned solid electrolyte paste may be used as the solid electrolyte material. The carbon material may be used as the conductive auxiliary agent. The metal material may be used as the auxiliary agent, in addition to the carbon material. Pd, Ni, Cu, Fe, or alloy thereof may be used as the metal material. When the composition of the first internal electrode 10 is different from that of the second internal electrode 20, paste for internal electrode used for the first internal electrode 10 and another paste for internal electrode used for the second internal electrode 20 may be individually made.

(Making process of paste for external electrode) Next, paste for external electrode is made in order to make the first external electrode 40a and the second external electrode 40b. It is possible to make the paste for external electrode, by evenly dispersing a conductive material, a glass frit, a binder, plasticizer and so on into water or organic solvent.

(Making process of solid electrolyte green sheet) The material powder for solid electrolyte layer is evenly dispersed into aqueous solvent or organic solvent together with a binding agent, a dispersing agent, a plasticizer and so on. The resulting powder is subjected to wet crushing. And a solid electrolyte slurry having a desired average particle diameter is obtained. In this case, a bead mill, a wet jet mill, a kneader, a high pressure homogenizer or the like may be used. It is preferable that the bead mill is used because adjusting of particle size distribution and dispersion are performed at the same time. A binder is added to the resulting solid electrolyte slurry. Thus, solid electrolyte paste is obtained. The solid electrolyte paste is printed. Thus, a solid electrolyte green sheet 51 is obtained. The printing method is not limited. For example, a slot die method, a reverse coat method, a gravure coat method, a bar coat method, a doctor blade method or the like may be used. It is possible to measure the particle size distribution after the wet-crushing, by using a laser diffraction measurement device using a laser diffraction scattering method.

Figure 5A:
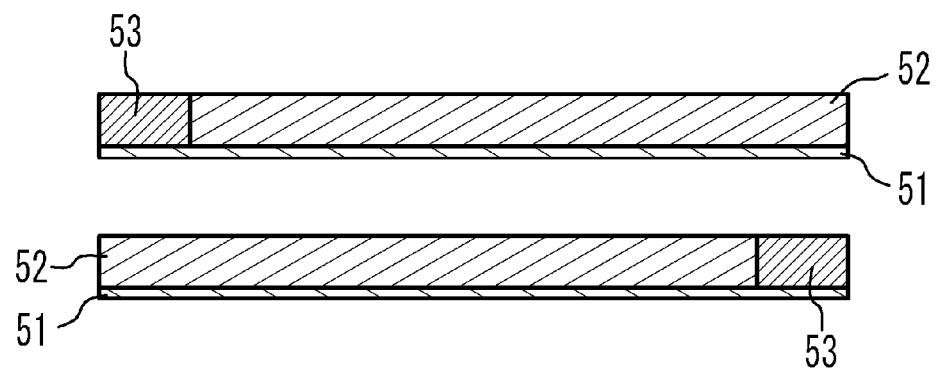
FIG. 5A and FIG. 5B illustrate a stacking process.
Figure 5B:
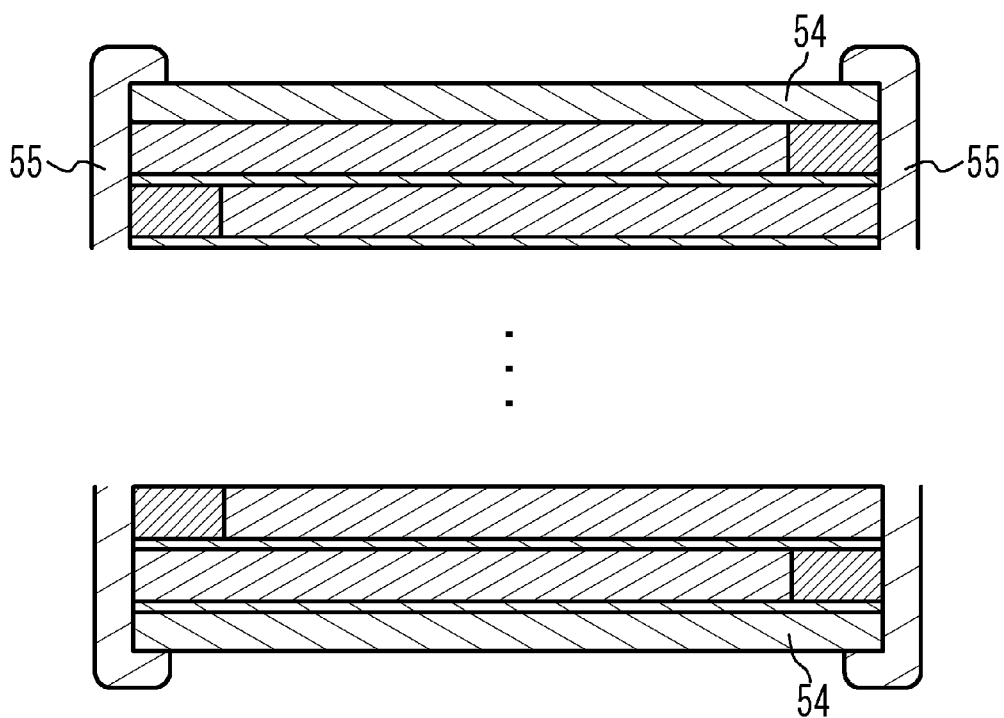

(Stacking process) Paste 52 for internal electrode is printed on one face of the solid electrolyte green sheet 51, as illustrated in FIG. 5A. A thickness of the paste 52 for internal electrode is equal to or more than a thickness of the solid electrolyte green sheet 51. A reverse pattern 53 is printed on a part of the solid electrolyte green sheet 51 where the paste 52 for electrode layer is not printed. A material of the reverse pattern 53 may be the same as that of the solid electrolyte green sheet 51. The solid electrolyte green sheets 51 after printing are stacked so that each of the solid electrolyte green sheets 51 is alternately shifted to each other. As illustrated in FIG. 5B, cover sheets 54 are clamped from an upper side and a lower side of the stacking direction. Thus, a multilayer structure is obtained. In this case, in the multilayer structure, each of the paste 52 for internal electrode is alternately exposed to the two end faces. The cover sheet 54 is formed by printing the material powder for cover layer with the same method as the forming of the solid electrolyte green sheet. The thickness of the cover sheet 54 is larger than the thickness of the solid electrolyte green sheet 51. The cover sheet 54 may be thickened during printing of the cover sheet 54. A plurality of the printed sheets may be stacked and may be used of the cover sheet 54.

Next, the two end faces are coated with paste 55 for external electrode by dipping method or the like. After that, the paste 55 for external electrode is dried. Thus, a compact for forming the all solid battery 100a is obtained.

(Firing process) Next, the multilayer structure is fired. In the firing process, it is preferable that a maximum temperature is 400 degrees C. to 1000 degrees C. in oxidizing atmosphere or non-oxidizing atmosphere. It is more preferable that that maximum temperature is 500 degrees C. to 900 degrees C. In order to sufficiently remove the binder until the maximum temperature, a process for keeping a temperature lower than the maximum temperature in oxidizing atmosphere may be performed. It is preferable that the firing is performed in the lowest possible temperature, from a viewpoint of reduction of the process cost. After the firing, a re-oxidizing process may be performed. In this manner, the all solid battery 100a is manufactured.

Second Embodiment

Figure 6A:
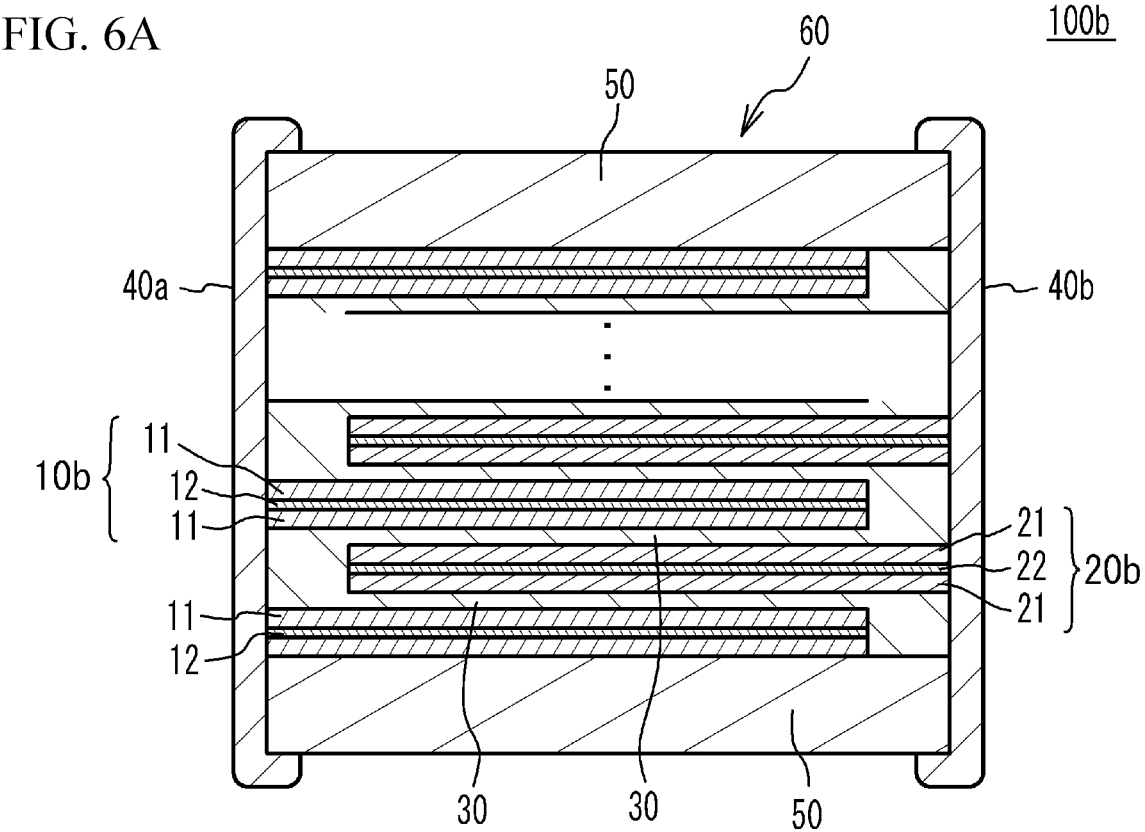
FIG. 6A and FIG. 6B illustrate a schematic cross section of another all solid battery.
Figure 6B:
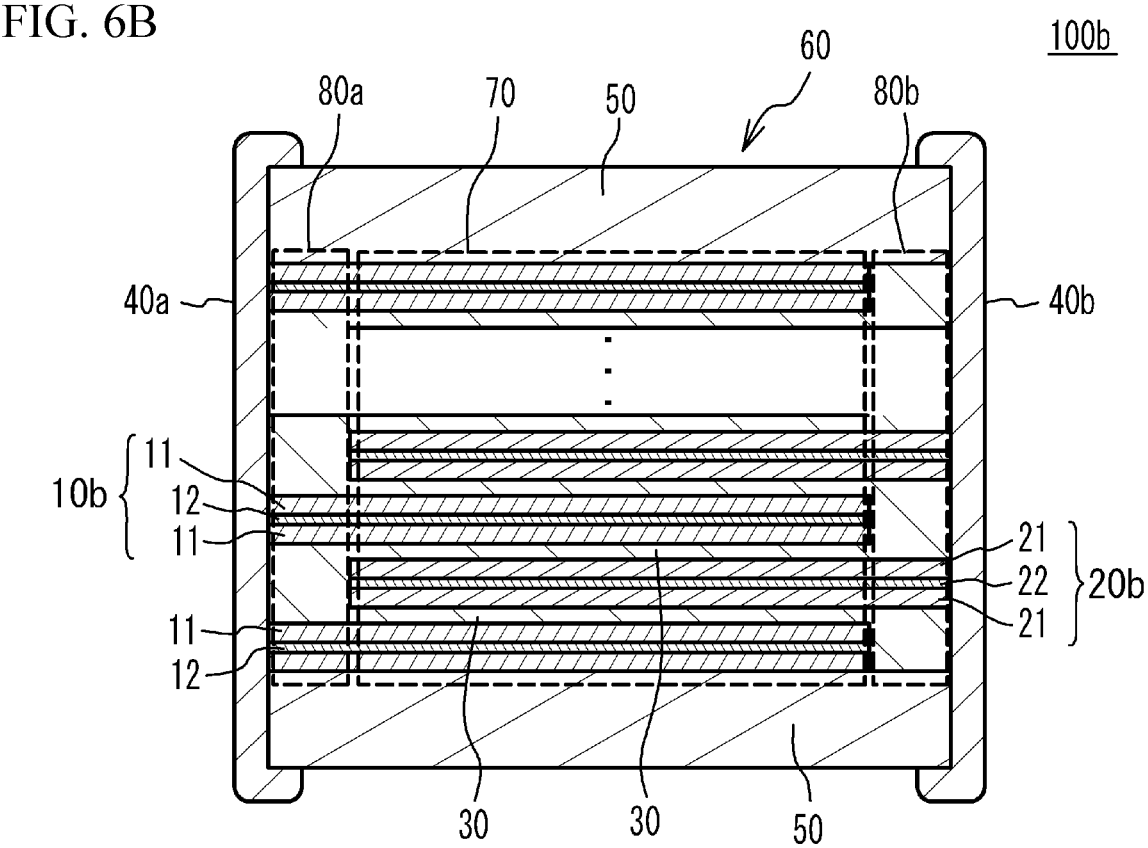

FIG. 6A and FIG. 6B illustrate an all solid battery 100b in accordance with a second embodiment. As illustrated in FIG. 6A and FIG. 6B, the all solid battery 100b is different from the all solid battery 100a in a point that first internal electrodes 10b are provided instead of the first internal electrodes 10, and second internal electrodes 20b are provided instead of the second internal electrodes 20. As illustrated in FIG. 6A, the first internal electrodes 10b have a structure in which a first electric collector layer 12 is sandwiched by two first internal electrode layers 11. The second internal electrodes 20b have a structure in which a second electric collector layer 22 is sandwiched by two second internal electrode layers 21. The first internal electrode layer 11 is made of the same material as the first internal electrode 10. The second internal electrode layer 21 is made of the same material as the second internal electrode 20. A main component of the first electric collector layer 12 and the second electric collector layer 22 is a conductive material. For example, a metal or carbon may be used as the conductive material of the first electric collector layer 12 and the second electric collector layer 22. When the first electric collector layer 12 is connected with the first external electrode 40a and the second electric collector layer 22 is connected with the second external electrode 40b, current collecting efficiency is improved.

Figure 7A:
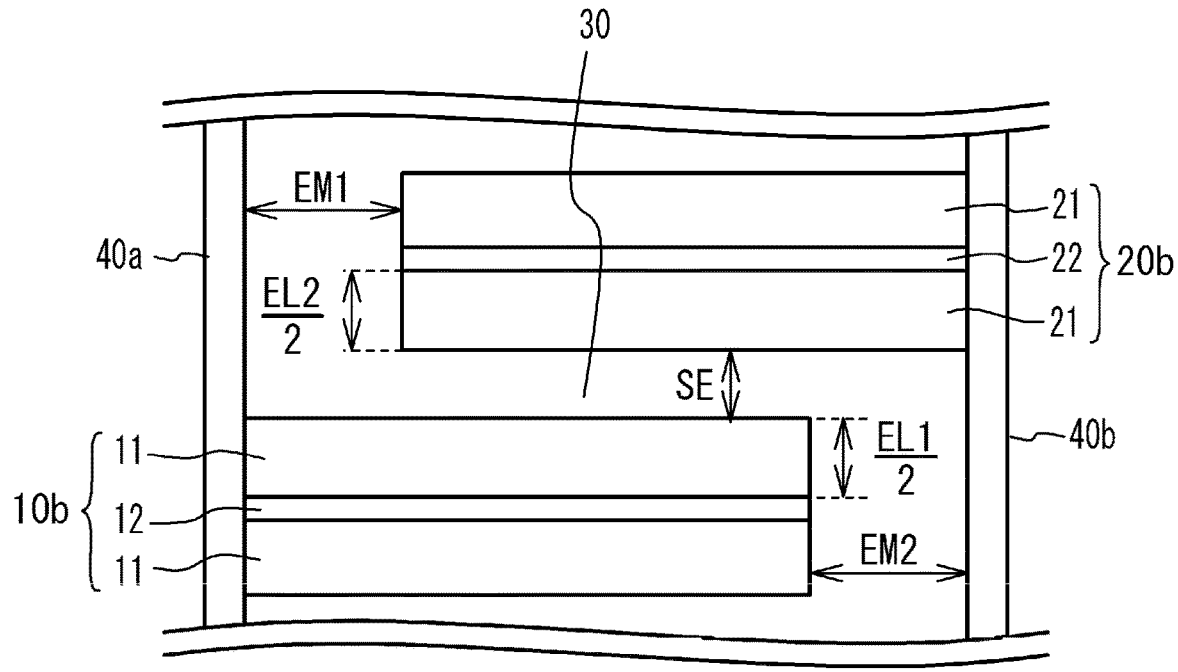
FIG. 7A and FIG. 7B illustrate each size.

FIG. 7A illustrates a definition of a thickness of each portion of the all solid battery 100b. As illustrated in FIG. 7A, in the all solid battery 100b, the thickness SE can be defined as an average thickness of each of the solid electrolyte layers 30 in the overlap portion 70 illustrated in FIG. 6B. A half of the thickness EL1 can be defined as an average thickness of each of the first internal electrode layers 11. Therefore, a half of the thickness EL2 can be defined as an average thickness of each of the second internal electrode layers 21. The thickness EL1 can be defined as an average thickness of a portion of the first internal electrode 10b except for the first electric collector layer 12. The thickness EL2 can be defined as an average thickness of a portion of the second internal electrode 20b except for the second electric collector layer 22.

Figure 7B:
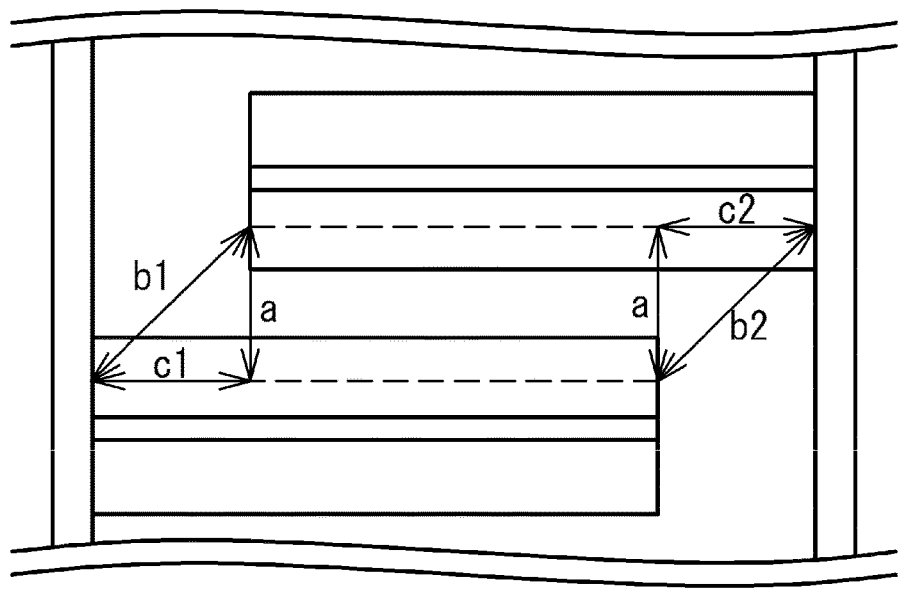

Next, as illustrated in FIG. 7B, "a" is defined as SE+EL1/4+EL2/4. A length of hypotenuse is "b1" when "c1" is EM1, "c2" is EM2, and the length "a" and the length "c1" are two sides crossing at right angles. A length of hypotenuse is "b2" when the length "a" and the length "c2" are two sides crossing at right angles.

When the paste for the internal electrode, paste for the electric collector layer including the conductive material, and the paste for the internal electrode are stacked in this order and are fired in the manufacturing method of the first embodiment, the first internal electrode 10b and the second internal electrode 20b of the all solid battery 100b are formed.

EXAMPLES

The all solid batteries in accordance with the embodiment were made and the property was measured.

Example 1

A sintering assistant was added to phosphoric acid-based solid electrolyte having a predetermined particle diameter. The phosphoric acid-based solid electrolyte and the sintering assistant were dispersed in dispersion medium. Thus, solid electrolyte slurry was obtained. A binder was added to the resulting solid electrolyte slurry. Thus, solid electrolyte paste was made. A green sheet was made by printing the solid electrolyte paste.

The electrode active material and the solid electrolyte material were highly dispersed with use of a wet-bead mill. Thus, ceramic paste including only ceramic grains was made. Next, the ceramic paste and the conductive auxiliary agent were mixed Thus, paste for the internal electrode was made.

The paste for the internal electrode was printed on the solid electrolyte green sheet, with use of a screen having a predetermined pattern. 100 numbers of the green sheets after the printing were stacked so that each of the electrodes is alternately shifted to right and left.

A sintering assistant was added to a phosphoric acid-based solid electrolyte having a predetermined particle diameter. The phosphoric acid-based solid electrolyte and the sintering assistant were dispersed in dispersion medium. Thus, solid electrolyte slurry was obtained. A binder was added to the resulting solid electrolyte slurry. Thus, paste for a cover sheet was made. A cover sheet was made by printing the paste for cover sheet.

Cover layers in which the cover sheets were stacked were adhered to an upper face and a lower face of the multilayer structure of the stacked green sheets after the printing. The cover layers were clamped to the multilayer structure by a heating pressurizing press. The resulting multilayer structure was cut into a predetermined size by a dicer. Thus, a multilayer structure having a rectangular parallelepiped shape was obtained. Two end faces of the resulting multilayer structure to which the paste for internal electrode was exposed were coated with paste for external electrode by a dipping method or the like. After that, the paste for the external electrode was dried. After that, the binder was removed by a thermal treatment of 300 degrees C. or more and 500 degrees C. or less. And, the resulting multilayer structure was subjected to a thermal treatment of 900 degrees C. or less. In the thermal treatment, each compound was sintered. Thus, a sintered structure was obtained.

The thickness EL1/2 and the thickness EL2/2 were 20 µm. The thickness SE was 20 µm. The length EM1 and the length EM2 were 200 µm. The ratio c1/a and the ratio c2/a were 5.

Example 2

In an example 2, the thickness EL1/2 and the thickness EL2/2 were 10 µm. The thickness SE was 10 µm. The length EM1 and the length EM2 were 200 µm. The ratio c1/a and the ratio c2/a were 10. Other conditions were the same as those of the example 1.

Example 3

In an example 3, the thickness EL1/2 and the thickness EL2/2 were 5 µm. The thickness SE was 5 µm. The length EM1 and the length EM2 were 200 µm. The ratio c1/a and the ratio c2/a were 20. Other conditions were the same as those of the example 1.

Example 4

In an example 4, the thickness EL1/2 and the thickness EL2/2 were 20 µm. The thickness SE was 40 µm. The length EM1 and the length EM2 were 200 µm. The ratio c1/a and the ratio c2/a were 3.3. Other conditions were the same as those of the example 1.

Example 5

In an example 5, the thickness EL1/2 and the thickness EL2/2 were 180 µm. The thickness SE was 20 µm. The length EM1 and the length EM2 were 200 µm. The ratio c1/a and the ratio c2/a were 1. Other conditions were the same as those of the example 1.

Example 6

In an example 6, the thickness EL1/2 and the thickness EL2/2 were 20 µm. The thickness SE was 20 µm. The length EM1 and the length EM2 were 60 µm. The ratio c1/a and the ratio c2/a were 1.5. Other conditions were the same as those of the example 1.

Example 7

In an example 7, the thickness EL1/2 and the thickness EL2/2 were 20 µm. The thickness SE was 20 µm. The length EM1 and the length EM2 were 700 µm. The ratio c1/a and the ratio c2/a were 17.5. Other conditions were the same as those of the example 1.

Comparative Example 1

In a comparative example 1, the thickness EL1/2 and the thickness EL2/2 were 2 µm. The thickness SE was 2 µm. The length EM1 and the length EM2 were 200 µm. The ratio c1/a and the ratio c2/a were 50. Other conditions were the same as those of the example 1.

Comparative Example 2

In a comparative example 2, the thickness EL1/2 and the thickness EL2/2 were 2 µm. The thickness SE was 0.5 µm. The length EM1 and the length EM2 were 200 µm. The ratio c1/a and the ratio c2/a were 80. Other conditions were the same as those of the example 1.

Comparative Example 3

In a comparative example 3, the thickness EL1/2 and the thickness EL2/2 were 20 µm. The thickness SE was 60 µm. The length EM1 and the length EM2 were 200 µm. The ratio c1/a and the ratio c2/a were 2.5. Other conditions were the same as those of the example 1.

Comparative Example 4

In a comparative example 4, the thickness EL1/2 and the thickness EL2/2 were 230 µm. The thickness SE was 20 µm. The length EM1 and the length EM2 were 200 µm. The ratio c1/a and the ratio c2/a were 0.8. Other conditions were the same as those of the example 1.

Comparative Example 5

In a comparative example 5, the thickness EL1/2 and the thickness EL2/2 were 20 µm. The thickness SE was 20 µm. The length EM1 and the length EM2 were 40 µm. The ratio c1/a and the ratio c2/a were 1. Other conditions were the same as those of the example 1.

Comparative Example 6

In a comparative example 6, the thickness EL1/2 and the thickness EL2/2 were 20 µm. The thickness SE was 20 µm. The length EM1 and the length EM2 were 900 µm. The ratio c1/a and the ratio c2/a were 22.5. Other conditions were the same as those of the example 1.

(Short test) Each of the examples 1 to 7 and the comparative examples 1 to 6 was subjected to a short test. In the short test, a DC voltage is applied to samples. In concrete, a DC voltage of 0.5 V was continuously applied. When a C rate of a current after 1 hour regulated with respect to a discharge capacity of a sample was 0.01 C or less, the sample was determined as good "O". When the C rate of the current was more than 0.01 C, the sample was determined as bad "X".

(Responsiveness test) Each of the examples 1 to 7 and the comparative examples 1 to 6 was subjected to a responsiveness test. In the responsiveness test, a rate characteristic was evaluated. In concrete, charging and discharging were performed at 0.2 C. And charging and discharging were performed at 1 C. When a discharge capacity ratio (1 C/0.2 C) of a sample was 50% or more, the sample was determined as good "O". When the discharge capacity ratio is less than 50%, the sample was determined as bad "X".

(Operation ratio of non-overlap portion) The ratio of operation as a battery of the non-overlap portion was measured with respect to each of the examples 1 to 7 and the comparative examples 1 to 6. To be concrete, a surface potential distribution by using a Kelvin probe force microscope was measured. When the potential change between before and after charging of the non-overlap portion of a sample was approximately the same as that of the overlap portion of the sample, the sample was determined as good "O". When the potential change between before and after charging of the non-overlap portion of a sample was less than that of the overlap portion of the sample but the potential change of the non-overlap portion was detected, the sample was determined as so-so "A". When the potential change between before and after charging of the non-overlap portion of a sample was not detected, the sample was determined as bad "X".

(Total determination) When a sample was determined as good in the short test, the responsiveness test and the operation ratio of non-overlap portion, the sample was totally determined as good "O". When a sample was determined as bad in at least one of the short test, the responsiveness test and the operation ratio of non-overlap portion, the sample was totally determined as bad "X".

Table 1 shows the results of the short test, the responsiveness test, the operation ratio of the non-overlap portion, and the total determination. As shown in Table 1, the examples 1 to 7 were determined as good "O" in the total determination. It is thought that this was because the relationship of "1 μm≤SE≤50 μm", the relationship of "1 μm≤EL1≤200 μm", the relationship of "50 μm≤EM1≤800 μm" and the relationship of "c1/a≤20" were satisfied or the relationship of "1 μm≤SE≤50 μm", the relationship of 1 μm≤EL2≤200 μm", the relationship of "50 μm≤EM2≤800 μm", and the relationship of "c2/a≤20" were satisfied.

On the other hand, the operation ratio of the non-overlap portion of the comparative example 1 was determined as bad. It is thought that this was because the relationship of "c1/a≤20" or the relationship of "c2/a≤20" was not satisfied. The comparative example 2 was determined as bad in the short test. It is thought that this was because the relationship of "1 μm≤SE" was not satisfied. The comparative example 3 was determined as bad in the responsiveness test. It is thought that this was because the relationship of "SE≤50 μm" was not satisfied. The comparative example 4 was determined as bad in the responsiveness test. It is thought that this was because the relationship of "EL1≤200 μm" or the relationship of "EL2≤ 200 μm" was not satisfied. The comparative example 5 was determined as bad in the short test. It is thought that this was because the relationship of "50 μm≤EM1" or the relationship of "50 μm≤EM2" was not satisfied. The operation ratio of the non-overlap portion of the comparative example 6 was determined as bad. It is thought that this was because the relationship of "c1/a≤20" or the relationship of "c2/a≤20 μm" was not satisfied. Alternatively, it is thought that this was because the relationship of "50 μm≤EM1≤800 μm" or the relationship of "50 μm≤EM2≤800 μm" was not satisfied.

The results of the operation ratio of the non-overlap portion of the examples 1, 2 and 4 to 6 were better than those of the examples 3 and 7. It is thought that one of c1/a and c2/a was 15 or less.

TABLE 1

| | EL1 EL2 (μm) | SE (μm) | EM1 EM2 (μm) | c1/a c2/a | SHORT | RESPON- SIVENESS | OPERATION RATIO OF NON- INTERSECTION PORTION | DETERMI- NATION |
|---|---|---|---|---|---|---|---|---|
| EXAMPLE 1 | 20 | 20 | 200 | 5 | o | o | o | o |
| EXAMPLE 2 | 10 | 10 | 200 | 10 | o | o | o | o |
| EXAMPLE 3 | 5 | 5 | 200 | 20 | o | o | Δ | o |
| EXAMPLE 4 | 20 | 40 | 200 | 3.3 | o | o | o | o |
| EXAMPLE 5 | 180 | 20 | 200 | 1 | o | o | o | o |
| EXAMPLE 6 | 20 | 20 | 60 | 1.5 | o | o | o | o |
| EXAMPLE 7 | 20 | 20 | 700 | 17.5 | o | o | Δ | o |
| COMPARATIVE EXAMPLE 1 | 2 | 2 | 200 | 50 | o | o | x | x |
| COMPARATIVE EXAMPLE 2 | 2 | 0.5 | 200 | 80 | x | — | — | x |
| COMPARATIVE EXAMPLE 3 | 20 | 60 | 200 | 2.5 | o | x | x | x |
| COMPARATIVE EXAMPLE 4 | 230 | 20 | 200 | 0.8 | o | x | o | x |
| COMPARATIVE EXAMPLE 5 | 20 | 20 | 40 | 1 | x | — | — | x |
| COMPARATIVE EXAMPLE 6 | 20 | 20 | 900 | 22.5 | o | o | x | x |

Although the embodiments of the present invention have been described in detail, it is to be understood that the various change, substitutions, and alterations could be made hereto without departing from the spirit and scope of the invention.

What is claimed is:

1. An all solid battery comprising:
   a multilayer chip in which each of a plurality of solid electrolyte layers including a solid electrolyte and each of a plurality of internal electrodes including an electrode active material are alternately stacked, the multilayer chip having a rectangular parallelepiped shape, the plurality of internal electrodes being alternately exposed to two side faces other than two end faces in a stacking direction of the multilayer chip; and
   a pair of external electrodes, each of which contacts each of the two side faces,
   wherein a thickness SE of the solid electrolyte layer is 5 μm or more and 40 μm or less in an overlap portion in which two internal electrodes immediately adjacent to each other directly connected to different external electrodes overlap with each other in a planar view of the two internal electrodes, wherein when thicknesses of the two internal electrodes are EL1 and EL2, both a half of EL1 and a half of EL2 are 5 μm or more and 180 μm or less, wherein, a length EM from one of the pair of external electrodes to an end of an internal electrode connected to an other of the pair of external electrodes in an extension direction of the internal electrode is 60 μm or more and 700 μm or less, and wherein EM/(SE+EL1/4+EL2/4) is 1 or more and 20 or less.

2. The all solid battery as claimed in claim 1, wherein EM/(SE+EL1/4+EL2/4) is 17.5 or less.

3. The all solid battery as claimed in claim 1, wherein EM/(SE+EL1/4+EL2/4) is 10 or less.

4. The all solid battery as claimed in claim 1, wherein EM is 200 μm or less, and
wherein EM/(SE+EL1/4+EL2/4) is 10 or more and 20 or less.

5. An all solid battery comprising:
a multilayer chip in which each of a plurality of solid electrolyte layers including a solid electrolyte and each of a plurality of internal electrodes including an electrode active material are alternately stacked, the multilayer chip having a rectangular parallelepiped shape, the plurality of internal electrodes being alternately exposed to two side faces other than two end faces in a stacking direction of the multilayer chip; and
a pair of external electrodes, each of which contacts each of the two side faces, wherein each pair of the plurality of internal electrodes has a structure in which an electric collector layer of which a main component is a conductive material is sandwiched, wherein a thickness SE of the solid electrolyte layer is 5 μm or more and 40 μm or less in an overlap portion in which two internal electrodes next to each other connected to different external electrodes overlap with each other in a planar view of the two internal electrodes, wherein when a total thickness of two internal electrode layers of one of the two internal electrodes is EL1 and a total thickness of two internal electrode layers of the other of the two internal electrodes is EL2, both a half of EL1 and a half of EL2 are 5 μm or more and 180 μm or less, wherein, a length EM from one of the pair of external electrodes to an end of an internal electrode connected to an other of the pair of external electrodes in an extension direction of the internal electrode is 60 μm or more and 700 μm or less, and wherein EM/(SE+EL1/4+EL2/4) is 1 or more and 20 or less.

6. The all solid battery as claimed in claim 5, wherein EM/(SE+EL1/4+EL2/4) is 17.5 or less.

7. The all solid battery as claimed in claim 5, wherein EM/(SE+EL1/4+EL2/4) is 10 or less.

8. The all solid battery as claimed in claim 5, wherein EM is 200 μm or less, and
wherein EM/(SE+EL1/4+EL2/4) is 10 or more and 20 or less.

* * * * *